H. S. WILLETT.
SAW HANDLE.
APPLICATION FILED FEB. 16, 1910.
972,307.
Patented Oct. 11, 1910.
2 SHEETS—SHEET 1.
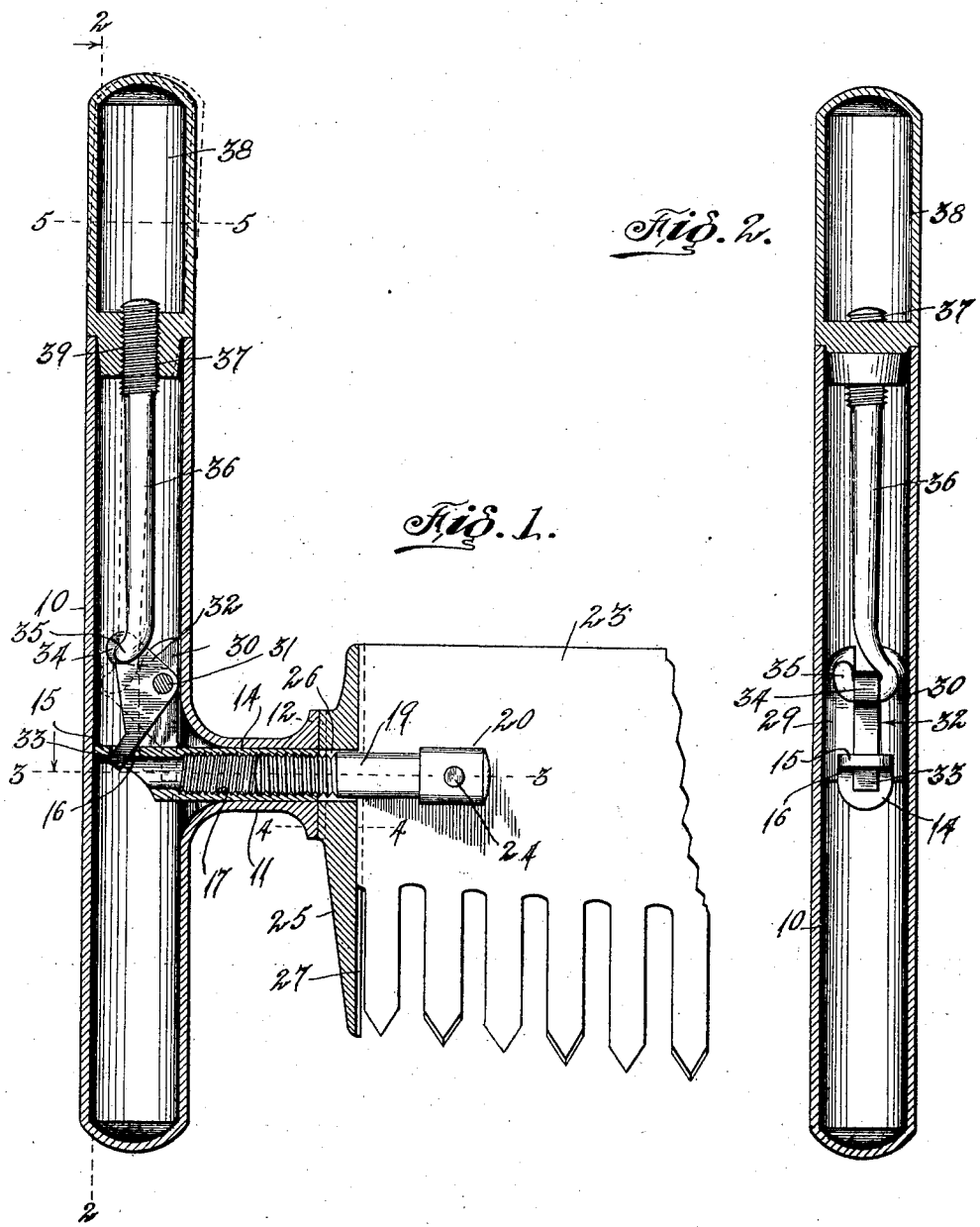

H. S. WILLETT.
SAW HANDLE.
APPLICATION FILED FEB. 16, 1910.
972,307.
Patented Oct. 11, 1910.
2 SHEETS—SHEET 2.
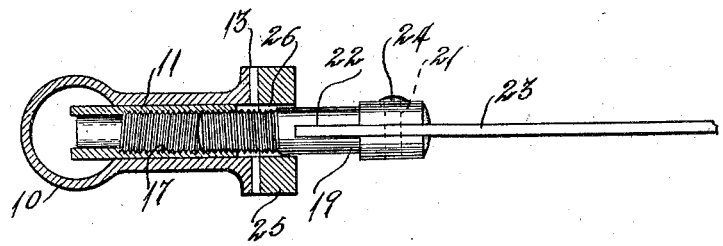
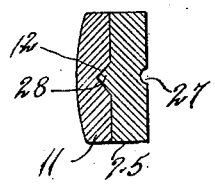
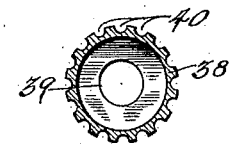
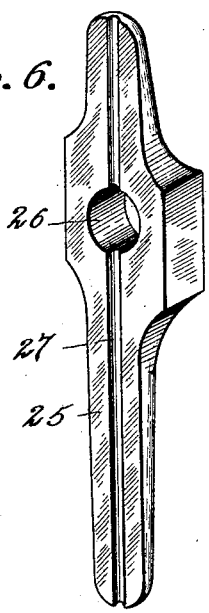
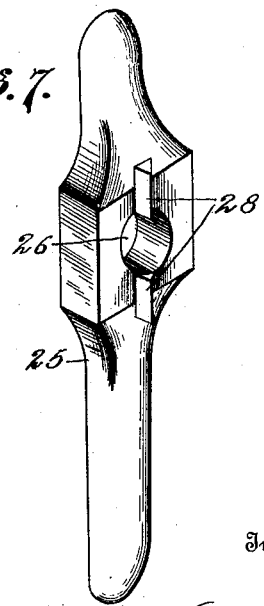
Witnesses
Jos Gregory
Henry T. Bright
Inventor
Harvey S. Willett
By Chandlee & Chandlee
Attorneys
THE NORRIS PETERS CO., WASHINGTON, D. C.

UNITED STATES PATENT OFFICE.

HARVEY S. WILLETT, OF KENNY, CALIFORNIA.

SAW-HANDLE.

972,307. Specification of Letters Patent. Patented Oct. 11, 1910.

Application filed February 16, 1910. Serial No. 544,226.

*To all whom it may concern:*

Be it known that I, HARVEY S. WILLETT, a citizen of the United States, residing at Kenny, in the county of Mendocino, State of California, have invented certain new and useful Improvements in Saw-Handles; and I do hereby declare the following to be a full, clear, and exact description of the invention, such as will enable others skilled in the art to which it appertains to make and use the same.

This invention relates to saw handles.

The object of the invention resides in so constructing a saw handle that same may be produced of material which when assembled in the construction of the handle will not affect the movable parts of said handle by shrinkage in dry weather and swelling in damp weather and at the same time will possess the proper strength and lightness to efficiently serve the ends for which it is designed.

Another object of the invention resides in the production of a saw handle which includes a simple and efficient mechanism for securing the saw blade to the handle and maintaining them together in a desired degree of rigidity; said mechanism being so constructed and arranged that same may be easily and quickly manipulated by the operator to more firmly secure the saw blade to the handle or release said blade therefrom.

A still further object of the invention resides in providing means whereby the handle may be adjusted into the plane of the saw or at right angles with relation thereto.

With the above and other objects in view the invention consists in the details of construction and in the arrangement and combination of parts to be hereinafter more fully described and particularly pointed out in the claims.

In describing the invention in detail reference will be had to the accompanying drawings wherein like characters of reference denote corresponding parts in the several views, and in which, Figure 1 is a vertical section of a saw handle constructed in accordance with the invention with the saw blade attached thereto and shown in fragment; certain parts of the mechanism for securing the saw blade to the handle being shown in full lines in the position they would occupy when the blade is firmly secured to the handle and in dotted lines in the position they would occupy when the blade is released from the handle; Fig. 2, a rear view with the casing of the handle in section on the line 2—2 of Fig. 1; Fig. 3, a section on the line 3—3 of Fig. 1; Fig. 4, a section on the line 4—4 of Fig. 1; Fig. 5, a section on the line 5—5 of Fig. 1; Fig. 6, a detail perspective view of the finger-guard looking at the front thereof; and, Fig. 7, a detail perspective view of the finger-guard looking at the rear thereof.

Referring to the drawings, the handle is shown as comprising a main body portion formed of a tubular member 10 having its lower end closed and provided intermediate its ends with a laterally extending portion 11 having a central bore communicating with the interior of the main body portion 10. The outer end of the portion 11 is enlarged and has its transverse face provided with angular grooves 12 and 13 disposed at right angles to each other, the purpose of which will be presently set forth. Loosely disposed in the bore of the portion 11 is a sleeve 14, the inner end of which is extended at its upper side to form a lip 15 and an aperture 16 is cut through the top thereof and communicates with the interior of said sleeve. The interior wall of the sleeve 14 is threaded as at 17 for engagement with the threaded inner end of the bolt 19. The outer end of said bolt 19 is enlarged as at 20 and provided with a transverse aperture 21. A slot 22 extends inward from the outer end of said bolt throughout a portion of its length and is adapted to receive the inner end of the saw blade 23; said blade being provided with an aperture adapted for registration with the aperture 21 in the bolt whereby the bolt and blade may be detachably connected together through the instrumentality of a suitable rivet 24. A finger guard 25 provided with an aperture 26 for the reception of the bolt 19, is disposed between the inner end of the saw blade 23 and the outer end of the portion 11. The front face of said guard is provided with a groove 27 for the reception of the inner edge of the saw blade, while the rear face has formed thereon angular projections 28 corresponding to the grooves 12 and 13 in the outer end of the portion 11 and adapted to be seated in the groove 12 when the handle is secured to the blade and disposed in the same plane therewith and in the grooves 13 when the handle is secured to the blade and disposed at right angles to the plane of the blade.

Formed in the inner wall of the body portion 10 of the handle, just above the longitudinal axis, of the laterally extending portion 11 are spaced lugs 29 and 30 between which is journaled, through the instrumentality of a pivot pin 31, a bell crank 32, one arm 33 of which projects through the aperture 16 in the top of the sleeve 14. The other arm 34 of said bell crank has pivotally connected thereto the lower hook-shaped end 35 of a draw bar 36; the upper end of said draw bar being threaded as at 37.

The open upper end of the main body portion 10 of the handle is closed by means of a hollow cap 38 of tubular formation with its upper end closed and its lower end provided with a reduced longitudinal extension tapering outwardly and having a central threaded bore 39 therethrough adapted to receive the threaded upper end 27 of the draw bar 36. The cap 38 has its outer cylindrical face provided with longitudinal corrugations 40 to afford a better gripping surface when said cap is manipulated to adjust the blade on the handle or release same therefrom.

The operation of securing the saw blade to the handle is as follows: Assuming the bolt 19 to be attached to the blade 23 with its threaded end inserted in the sleeve 14 and the various other parts of the handle disposed in the position shown in dotted lines, it will only be necessary in order to draw the blade and the handle together to rotate the cap 38 on its longitudinal axis so as to raise the draw bar 36. This upward movement of the draw bar will in turn move the bell crank 32 to the position shown in full lines which movement of said bell crank will cause the arm 33 thereof to draw the sleeve 14, bolt 19 and blade 23 inwardly of the handle and result in firmly connecting the blade and handle together. After the blade has been once adjusted to the handle, should it again become loose it will be only necessary to rotate the cap 38 to cause an additional upward movement of the draw bar 36 and thus quickly and easily effect the proper assembling of the handle and blade without material loss of time or any inconvenience.

Should it be desired to assemble the handle at right angles to the plane of the saw it will only be necessary to rotate the cap 38 to lower the draw bar 36. This downward movement of the draw bar will as is obvious, cause the bell crank to move the sleeve 14 and bolt 19 outwardly with respect to the handle and thus release the engagement between the inner end of the saw and the finger-guard 25. The finger guard can then be moved outwardly so as to disengage the projections 28 from the groove 12, when the handle can be rotated on its transverse axis so that when the blade is again drawn to the handle, in the manner previously described, the projections 28 will seat in the grooves 13 and the handle thus secured at right angles to the plane of the saw blade.

It will also be noted that when the blade and finger-guard 25 are moved away from the outer end of the extension 11 so that the projections 28 may be removed from either the grooves 12 or 13 the handle and sleeve 14 may be rotated independently of the bolt 19 and thus change the adjustment of said sleeve and bolt; this change of adjustment between the sleeve and bolt will in turn enable a different adjustment through the instrumentality of the cap 38 and the connections between said cap and sleeve.

What is claimed is:—

1. In a device of the character described, the combination with a saw blade, of a handle, a movable member carried by said handle, connections between the movable member and the saw blade whereby the movement of said member will shift said saw blade toward and away from the handle in a direction transverse of the latter, and rotatable means for moving said member, said means constituting a portion of the handle and having its axis of rotation co-incident with the vertical axis of the handle.

2. In a device of the character described, the combination with a saw blade, of a handle, a movable member carried by said handle, connections between the movable member and the saw blade whereby the movement of said member will shift said saw blade toward and away from the handle in a direction transverse of the latter, and rotatable means for moving said member, said means constituting one end of the handle and having its axis of rotation co-incident with the vertical axis of the handle.

3. In a device of the character described, the combination with a saw blade, of a handle, a movable member carried by said handle, connections between the member and the saw blade whereby the movements of said member will shift the saw blade toward and away from the handle, and a rotatable member disposed at one end of said handle and having its axis of rotation co-incident with the vertical axis of the handle, connections between the rotatable member and movable member for effecting the movement of the latter by the rotation of the former.

4. In a device of the character described, the combination with a saw blade, of a hollow handle provided with a lateral extension having a central bore communicating with the interior of the handle, a pivoted member mounted in the handle, connections between the saw blade and the pivoted member, a rotatable member disposed at one end of said handle, connections between the rotatable member and the pivoted member for effecting the movement of the latter by the rotation of the former, whereby the saw blade may be shifted toward and away from the handle.

5. In a device of the character described, the combination with a saw blade, of a hollow handle provided with a lateral extension having a central bore communicating with the interior of the handle, a bell-crank mounted in said handle, connections between one arm of the bell-crank and the saw blade disposed in the bore of said extension, a draw-bar having its lower end connected with the other arm of said bell-crank and its upper end threaded, and a cap disposed at one end of the handle and having a threaded engagement with the upper end of said draw-bar, whereby the rotation of said cap will lower and raise said drawbar to effect a movement of the bell crank, whereby the saw blade may be shifted toward and away from the handle.

6. In a device of the character described, the combination with a saw blade, of a handle, a member slidably mounted in said handle and having one end connected to the saw blade and its other end provided with an aperture, a pivoted bell crank carried by the handle having one arm projecting into said aperture and engaging opposite sides thereof whereby the movements of the bell crank will shift said saw blade toward and away from the handle, and means connected to the other arm of said bell crank for moving same.

7. In a device of the character described, the combination with a saw blade, of a handle, a member slidably mounted in said handle and having one end connected to the saw blade and its other end provided with an aperture, a pivoted bell crank carried by the handle having one arm projecting into said aperture and engaging opposite sides thereof whereby the movements of the bell crank will shift said saw blade toward and away from the handle, and rotatably operated means connected to the other arm of said bell crank for moving same.

In testimony whereof, I affix my signature, in presence of two witnesses.

HARVEY S. WILLETT.

Witnesses:
  VERNON VAN BUSKIRK,
  JOSEPH P. THOMAS.